United States Patent [19]

Nishiura et al.

[11] Patent Number: 5,057,710
[45] Date of Patent: Oct. 15, 1991

[54] ELECTRET MATERIALS AND THE METHOD FOR PREPARING THE ELECTRET MATERIALS

[75] Inventors: Eiichi Nishiura; Katsutoshi Ando, both of Otsu, Japan

[73] Assignee: Toray Industries, Inc., Tokyo, Japan

[21] Appl. No.: 457,781

[22] PCT Filed: Nov. 11, 1988

[86] PCT No.: PCT/JP88/01136
§ 371 Date: Jan. 11, 1990
§ 102(e) Date: Jan. 11, 1990

[87] PCT Pub. No.: WO89/11156
PCT Pub. Date: Nov. 16, 1989

[30] Foreign Application Priority Data

May 13, 1988 [JP] Japan .................... 63-117950

[51] Int. Cl.$^5$ .................................. G11C 13/02
[52] U.S. Cl. .................................. 307/400
[58] Field of Search ........................ 307/400

[56] References Cited

U.S. PATENT DOCUMENTS 4,086,499 4/1978 Mishra ........................ 307/400
4,527,218 7/1985 von Seggern ............... 307/400
4,626,263 12/1986 Inoue et al. ................. 307/400
4,789,504 12/1988 Ohmori et al. .............. 264/22

FOREIGN PATENT DOCUMENTS 0160497 11/1985 European Pat. Off.

Primary Examiner—A. D. Pellinen
Assistant Examiner—Jeffrey A. Gaffin
Attorney, Agent, or Firm—Armstrong, Nikaido, Marmelstein, Kubovcik & Murray

[57] ABSTRACT

This invention relates to an electret material having thermal stability and capable having high trapped charge quantity and stably existing for a long period of time and a process for preparing the electret material. The electret material is characterized in that it comprises 100 parts by weight of polypropylene, 0.01 to 2 parts by weight of a least one stabilizer selected from among hindered amine, nitrogen-containing hindered phenol, and metal-containing hindered phenol stabilizer and that at least part of the propylene has such a molecular weight distribution that the $M(w)/M(n)$ ratio wherein $M(w)$ is a weight-average molecular weight is 5.5 or less. The electret material can be widely used for various applications and, e.g., is best suited for use in, e.g., various filter materials, wiper materials, absorption materials, masking materials, and dust-proof materials.

11 Claims, 1 Drawing Sheet

ELECTRET MATERIALS AND THE METHOD FOR PREPARING THE ELECTRET MATERIALS

DESCRIPTION

1. Technical Field

The present invention relates to electret materials having thermal stability and high amounts of trap electric charge and being stable for a long time and the method for preparing them.

The electret materials obtained by the present invention are most suitably used for, for example, various filter materials, wiping materials, absorbing materials, mask materials, materials for dust-protecting clothes and so on and can be used in wide ranges of applications by utilizing the good electret characteristics.

2. Background Art

Up to this time, various methods were described on the page 155 of the Handbook of Static Electricity (Ohm-Sha, published on May 30, 1981) and Japanese Patent Laid-Open No. 61-289177 as the methods for preparing electret of polymers. And, in these methods, polarization is carried out by generating implantation of electrons, movement of ions, orientation of dipoles and so on and electric charge is given in consequence.

Moreover, as one of the electretification technologies for obtaining high electretification effect, a technology which gave an electretification effect by adding a compounded material to a polymer and thereby prepared an electret material, was proposed. For example, there is a method described on Japanese Patent Laid-Open No. 60-196922.

However, by the method described on the above described Japanese Patent Laid-Open No. 60-196922 where a metal salt of an aliphatic acid was compounded in polypropylene and a corona treatment was carried out, the amount of trap electric charge increased in some extent and electretification effect was recognized, but this was not an enough level for a sufficient electret material.

DISCLOSURE OF INVENTION

The technological problems to be solved by the present invention are to offer an electret material having no defect which the above described conventional materials have and especially to offer an electret material having high amount of electric charge at high temperature and thereby being capable of having high heat resistance and holding stably the electric charge for a long time.

The present invention has the following constitutions.

Namely, the electret materials of the present invention are electret materials characterized by compounding 0.01 parts by weight or more and 2 parts by weights or less of at least one stabilizer selected from stabilizers of hindered amines, nitrogen-containing hindered phenols and metal-containing hindered phenol against 100 parts by weight of polypropylene and by using, at least as a part, a polypropylene whose molecular weight distribution is 5.5 or less in the ratio of Mw/Mn (Mw:weight average molecular weight, Mn:number average molecular weight).

Moreover, the method for preparing the electret materials of the present invention is the method for preparing the electret materials characterized by using a polypropylene containing 0.01 parts by weight or more and 2 parts by weight or less of at least one stabilizer selected from stabilizers of hindered amines, nitrogen-containing hindered phenols and metal-containing hindered phenol, reducing the molecular weight distribution of the polypropylene to 5.5 or less in its ratio of Mw/Mn (Mw:weight average molecular weight, Mn:number average molecular weight), molding the compound in a desired shape and applying thereon an electret treatment.

The electret materials of the present invention, as described above, can have high amounts of trap electric charge and it is therefore offer electret materials having high heat stability on said electric charge and being capable of exhibiting electret characteristics stably for a long time.

The electret materials of the present invention like this are most suitable for various filter materials, wiper materials, absorbing materials, materials for dust-protecting clothes and so on by utilizing the above described characteristics and the present invention therefore has such practical excellent effects that it is possible to use electret materials in various wide range of applications and fields.

BEST MODE FOR CARRYING OUT THE INVENTION

Figure 1:
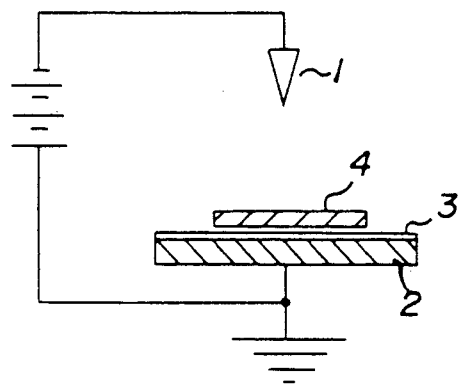
FIG. 1 is a rough figure illustrating an example carrying out an electret treatment on a sheet-like material and the method used in the below described Examples.

Electret materials of the present invention and the method for preparing the electret materials are explained in more detail as follows.

The present inventors have been extensively studying to obtain electret materials being stable against high heat and capable of holding stably electric charge by keeping high amount of trap electric charge at high temperature and found that it is very effective to use a material prepared by using a polypropylene containing 0.01 parts by weight or more and 2 parts by weight or less of at least one stabilizer selected from stabilizers of hindered amines, nitrogen-containing hindered phenols and metal-containing hindered phenols against 100 parts by weight of polypropylene whose ratio of Mw/Mn (Mw:weight average molecular weight, Mn:number average molecular weight) is 5.5 or less in its molecular weight distribution and thereafter to carry out an electret treatment on said material.

When the polypropylene is polymerized by means of the conventional usual method, the ratio of Mw/Mn in its molecular weight distribution becomes to be about 6-8, but the present inventors found the fact that it was especially desirable for electretification that the molecular weight distribution was sharp (Mw/Mn was small). Namely, it was important that the one whose said ratio of Mw/Mn was 5.5 or less and namely, molecular weight distribution was sharp, was used and more preferably it was 4.0 or less.

As the method for making the molecular weight distribution sharp like this, (1) a method of degradation by mixing free radical source compounds, (2) a method of thermal degradation, (3) a method of degradation by kneading,
(4) a method of degradation by irradiating with radiation and so on can be cited and either method can be used in the present invention. According to the results obtained by the present inventors, the most effective method is the one where free radical source compound, a thermal stabilizer and so on are mixed with the polypropylene powder and reduced in an extruder but it is not especially restricted on this method.

In the above described method, as the free radical source compound, various kinds of peroxides, diazo compounds and so on can be used and the mixing amount of said radical producer should be changed in accordance with the type of said radical producer, the degradating temperature, the degradating time and the type of compounding agent to be mixed. Generally, it is preferable that the amount is 0.0005 parts by weight to 0.5 parts by weight to 100 parts by weight of polypropylene.

Moreover, it is important that polypropylene used in the present invention contains 0.01 parts by weight or more and 2 parts by weight or less of at least one stabilizers selected from stabilizers of hindered amines, nitrogen-containing hindered phenols and metal-containing hindered phenols.

For example, as these stabilizers, in case of stabilizers of hindered amines, poly[{(6-(1,1,3,3,-tetramethylbutyl-)imino-1,3,5-triazine-2,4-diil} {2,2,6,6,-tetramethyl-4-pyperizil)imino} hexamethylene {2,2,6,6-tetramethyl-4-pyperizil)imino}], dimethyl succinate-1-(2-hydroxyethyl)-4-hydroxy-2,2,6,6-tetramethylpiperidine polycondensate, 2-(3,5-di-t-butyl-4-hydroxybenzyl)-2-n-butylmalonic acid bis(1,2,2,6,6-pentamethyl-4-piperidil) can be practically cited.

As the nitrogen-containing hindered phenol stabilizers, 1,3,5-tris(4-t-butyl-3-hydroxy-2,6-dimethylbenzyl) isocyanulic acid or 1,3,5-tris(3,5-di-t-butyl-4-hydroxybenzyl) isocyanulic acid are cited.

As the metal-containing hindered phenol stabilizers, calcium salt of 3,5-di-t-butyl-4-hydroxy benzyl-monoethyl-phosphonate, nickel salt of 3,5-di-t-butyl-4-hydroxy-benzyl-mono-ethyl-phosphonate or magnecium salts of the above described compounds can be cited.

The effect of the present invention can be recognized when all the above described stabilizers are effective when they are compounded with the polypropylene whose molecular weight distribution is made sharp and ratio of Mw/Mn is made small, but among them, the most effective stabilizer for electretification is the hindered amine type stabilizer from the results obtained by the present inventors. Moreover, as the result of further investigation, among the hindered amine type stabilizers, poly[{(6-(1,1,3,3-tetramethylbutyl) imino-1,3,5-triazine-2,4-diil} {(2,2,6,6-tetramethyl-4-piperidil)imino} hexamethylene {2,2,6,6-tetramethyl-4-piperidil)imino}] is especially most effective.

It is not preferable that when the amount of compounding of the above described stabilizer is less than 0.01 parts by weight, due to the partial consumption of the said stabilizer during usage, the electretification effect decreases and the heat-resistant stability of the material itself becomes insufficient and when the amount of compounding of the stabilizer is 2 parts by weight or more, there is no problem on electretification, but homogeneity as the material is insufficient and color changing phenomenon occurs. Considering these points, the preferable amount of compounding is 0.02 parts by weight −0.7 parts by weight and more preferably in the range of 0.05 parts by weight −0.5 parts by weight.

From the above described results, it may be important that the stabilizers used in the present invention are those stabilizers which have relatively large molecular weight and do not volatilize or decompose at the heat of treatment (about 200° C.-400° C.).

Moreover, it is important that there is compatibility between polypropylene and the stabilizers from the point of the stability for the long period.

The electret characteristics of the polypropylene compounded with the above described stabilizers are that the heat stability is high and the decrease in the amount of trap electric charge is a little after usage in a severe condition.

For example, when an electret material made of a non-woven fabric is used for a filtering material, the electret material whose amount of trapped electrical charge obtained from thermally stimulated depolarization currents is $2.0 \times 10^{-10}$ coulomb/cm$^2$ or more is desirable and it is said that the electret material whose amount of trap electrical charge is $5.0 \times 10^{-10}$ coulomb/cm$^2$ or more is especially preferable. In case of non-woven fabrics, the electret material of the present invention has much higher level than said $5.0 \times 10^{-10}$ coulomb/cm$^2$ and generally, exhibits the amount of electric charge of about 7.0 to $10 \times 10^{-10}$ coulomb/cm$^2$. Thus, the electret materials of the present invention are at very high level. It is therefore possible to offer a material with which to get high performance can be aimed in various practical applications.

In the present invention, a ultraviolet ray absorber, for example, benzotriazol type ones, can be compounded at the same time in addition to the above described stabilizers.

Moreover, in addition to the above described at least one stabilizers selected from stabilizers of hindered amines, nitrogen-containing hindered phenols and metal-containing hindered phenols, at least one stabilizers selected from phenol type, sulfur type and phosphoric type stabilizers can be contained in polypropylene used in the present invention.

As the phenol type stabilizers used here, for example, 1,3,5-trimethyl-2,4-6-tris(3,5-di-t-butyl-4-hydroxybenzyl) benzene, pentaerythtyl-tetraxis[3-(3,5-di-t-butyl-4-hydroxyphenyl)propionate, octadecyl-3-(3,5-di-t-butyl-4-hydroxyphenyl) propionate and so on can be cited.

As the sulfuric compounds, distearylthiodipropionate, dilaurylthiodipropionate and so on can be cited.

As the phosphoric compounds, distearylpentaerylthriotoldiphosphite and so on can be cited.

In the electret materials of the present invention, polypropylene includes polypropylene homopolymer, copolymerized polypropylene and blends of polypropylene with other thermoplastic resin. Namely, in the electret materials of the present invention, as the polypropylene, for example, copolymerized polypropylene with ethylene can be used and polypropylene blended with a proper amount of other thermoplastic resins such as polyethylene, polystyrene, polycarbonate, polyester and so on can be used.

Polypropylene homopolymers, copolymerized polypropylene polymers and polypropylene polymers blended with other thermoplastic resins compounded with the above described stabilizers and whose molecular weigher distribution is made to be sharp by means of reduction are molded in a required shape for electret materials and then an electret treatment is thereon carried out.

For these moldings, as the shapes of the electret materials of the present invention, various shapes can be prepared and no special limitation exists. For examples, various required shapes such as sheet-like, film-like, fiber-like and pipe-like substances can be molded and used. In case of the sheet-like substances, knitted and woven fabrics, non-woven fabrics and so on can be used.

In the present invention, the electretification effect is exhibited in every shape as shown above, but fiber sheets, especially non-woven fabrics made of ultrafine fibers are preferable. For example, melt blow non-woven fabrics whose average fiber denier is 0.1 denier or less are more preferable. Moreover, spun-bonded non-woven fabrics and knitted and woven fabrics are preferable as high strength can be obtained.

Especially, when only the electret melt-blown non-woven fabric of the present invention is used and the strength is too small, a shape of laminated body of the electret melt-blown non-woven fabric with the electret spun-bonded non-woven fabric or the electret knitted and woven fabric of the present invention for reinforcement is also practical.

The electret materials of the present invention is not necessarily constituted of 100% of the above described polypropylene, but any substance besides said polypropylene can be used within the range where the effects of the present invention are not spoiled.

For example, in case of non-woven fabrics and knitted and woven fabrics, other substances can be therewith used for a specific purpose. For example, anti-electrostatic fibers can be used as a part of the constituting fibers.

Moreover, in case of knitted and woven fabrics, the knitted and woven fabrics can be made of 100% of the yarns made of the above described polypropylene, but other yarns can be properly used as a part of the yarns. For example, in case of woven fabrics, the above described polypropylene yarns are used only as warps or as wefts and other yarns are used for other parts.

According to the results obtained by the present inventors, if more than 50 weight % are the above described polypropylene in the electret materials of the present invention, very high effects of the present invention can be obtained.

However, even if the amount of the above described polypropylene to be used is smaller, the effects of the present invention can be recognized and the electret materials where the amount of the use is in such a low level as this can be of course included in the range of the present invention.

The effects of the electret materials of the present invention will be practically explained in accordance with examples as follows.

In the below described examples, the measurement of the amount of trap electric charge from the thermally stimulated depolarization currents can be done as follows.

Figure 2:
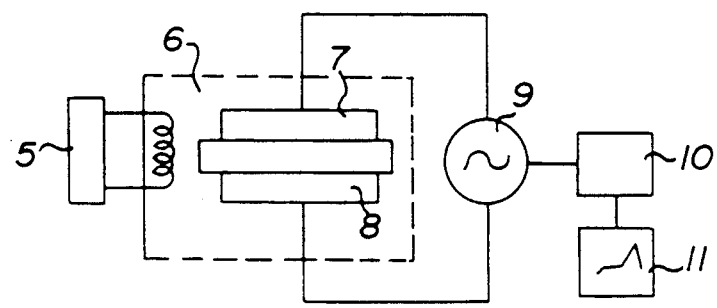
FIG. 2 is a rough figure illustrating a method for measuring the amount of trap electric charge from thermally excited dipolarized electric current the electret sheet-like material has.

Namely, the method for measuring the amount of trapped electrical charge from the thermally stimulated depolarization currents is as shown in an illustrated figure of FIG. 2 that both surfaces of the electret material 4 set in a heating bath 6 having a temperature controlling device 5 are strongly pinched with electrodes 7 and 8 and the measurement is done by connecting these electrodes with a highly sensitive electric current meter 9.

Namely, when the temperature of the heating bath is elevated at a constant elevating speed, for example, at 5° C./min from the room temperature to the vicinity of the melting point, trapped electric charge is depolarized and electric current is thereby generated. This electric current is recorded on a recorder 11 through a data processing device 10 and curves of depolarized electric current at various temperature ranges can be thereby obtained. The amount of trap electric charge is a quotient (the unit: coulomb/cm$^2$) obtained by dividing the amount of discharge by this depolarization by the area of the sample to be measured.

In the measurement of the amount of trap electric charge from the thermally stimulated depolarization currents, if the peak of the curve of the trap electric charge is positioned at high temperature, the electret is stable and if the amount of trap electric charge is large, the effect is high.

EXAMPLES 0.03 parts by weight of 2,6-di-t-butyl-p-cresol as a base stabilizer and 0.1 parts by weight of calcium stearate as a halogen catcher were compounded against 100 parts by weight of polypropylene.

This mixture is properly compounded with poly[{(6-(1,1,3,3-tetramethylbutyl)imino-1,3,5-triazine-2,4-diil} {(2,2,6,6-tetramethyl-4-piperidil)imino}-hexamethylene{(2,2,6,6-tetramethyl-4-piperidil)imino}] which is a hindered amine type stabilizer (hereafter, abbreviated as a stabilizer A), pentaerythrityltetrakis[3-(3,5-di-t-butyl-4-hydroxyphenyl) propionate] which is a phenol type stabilizer (hereafter, abbreviated as a stabilizer B), 1,3,5-tris(3,5-di-t-butyl-4-hydroxybenzyl)isocyanuric acid which is a nitrogen-containing hindered phenol type stabilizer (hereafter, abbreviated as a stabilizer C), calcium salt of 3,5-di-t-butyl-4-hydroxybenzyl-monoethyl-phosphonate which is a metal-containing hindered phenol type stabilizer (hereafter, abbreviated as a stabilizer D), distearylthiodipropionate which is a sulfur type stabilizer (hereafter, abbreviated as a stabilizer E), 2-hydroxy-4-n-octoxy-benzophenone which is a benzotriazol type ultraviolet ray absorber (hereafter, abbreviated as a stabilizer F) and 13 kinds of chips whose MI were about 45 and 295 and Mw/Mn were 4.5–5.2 and 2.8 were prepared by a method for reduction by mixing a radical producer and whose MI were about 45 and Mw/Mn were 6.6 were prepared without reduction respectively.

The above described chips were spun by means of a melt-blow method to obtain non-woven fabrics whose densities were 30 g/m$^2$ and average fiber diameters were about 0.03 denier.

The amounts of stabilizers compounded in the sheets obtained were shown in Table 1 and 2. The base stabilizer remained in the range of 0.001–0.005 parts by weight in the compounds and the halogen catcher remained in the range of 0.09–0.10 parts by weight in the compounds.

The electret treatment was carried out on 13 kinds of sheets (5 sheets in Examples 1–5 are related with the present invention and 8 sheets in Comparative Examples 1–8 are out of the present invention) by means of an apparatus shown in FIG. 1.

The treatment conditions were as follows. As the charging electrode, a needle-like electrode 1 made of iron whose volume resistivity was $10^{-6}$ Ωcm was used and as the earth electrode 2, a square iron plate whose side was 20 cm was used. On the earth electrode 2, a square sheet consisting of polyvinyl chloride compounded with carbon particles, whose thickness was 0.5 mm and side was 20 cm and having semi-conductivity whose volume resistivity was $10^4 \Omega cm$, was placed. The electret treatment was carried out on such conditions that the temperature, the humidity, the distance between the needle-like electrode 1 and the non-woven fabric sheet 4, the charged voltage and the charging time were 25° C., 65%, 5 cm, $-30$ Kv and 10 sec respectively.

The electret levels of the non-woven fabrics sheets 4 on which the electret treatments were carried out obtained by the amount of trap electric charge from the thermally stimulated depolarization currents were shown in Tables 1 and 2.

In comparison between Examples 1–5 and Comparative Examples 1–5, although differences existed depending on each stabilizer, it was found that the effect to decrease the ratio of Mw/Mn was remarkable in the molecular weight distribution.

When the stabilizer A, one of the hindered amines, was used, it was desirable that the electretification was effective and high level.

On the other hand, in the cases of Comparison Examples 6, 7, 8 where little amounts of stabilizers were used, the amounts of trap electric charge were small and low level. It was estimated that these results were due to the complex effect of two factors such as to use stabilizers and to decrease the ratio of Mw/Mn in the molecular weight distribution.

Namely, the electret materials obtained by the present invention can be most suitably used in wide range of application, for example, various filter materials, wiping materials, absorbing materials, mask materials, materials for dust-protecting clothes and so on. And, for example, when the electret materials obtained by the present invention are used for filter materials, they can exhibit strong filtering performances which are stable for a long time. And, for example, when the electret materials of this invention are used for wiping materials, they can exhibit strong wiping performances which are stable for a long time.

In the same way, when they are used for absorbing materials they can exhibit strong absorbing materials, and when they are used for mask materials they can exhibit strong masking performances which can protect dusts, and when they are used for dust-protecting clothes they can exhibit strong dust-protecting performances, which are stable and effective for a long time respectively. The electret materials of the present invention can exhibit the above good stabilizing electret performances when they are used in a high temperature conditions. And this merit is very convenient to be used for, for example, making clean the heated air (50°–60° C.) which is supplied to film-drawing process, or, making clean the air used in air-conditioning system in buildings.

We claim:

1. Electret materials characterized by compounding 0.01 parts by weight or more and 2 parts by weight or less of at least one stabilizer selected from stabilizers of hindered amines, nitrogen-containing hindered phenols

TABLE 1

| Stabilizer | Example-1 | Example-2 | Example-3 | Example-4 | Example-5 |
|---|---|---|---|---|---|
| Ratio of Mw/Mn | 4.8 | 5.2 | 4.9 | 4.7 | 2.8 |
| MI | 42 | 45 | 45 | 48 | 295 |
| Stabilizer-A | 0.048 | 0.190 | | 0.040 | 0.045 |
| Stabilizer-B | 0.025 | | | | 0.026 |
| Stabilizer-C | | | 0.155 | | |
| Stabilizer-D | 0.026 | | 0.220 | | 0.027 |
| Stabilizer-E | | 0.160 | | | |
| Stabilizer-F | | | | | 0.100 |
| Amount of trap electric charge | $9.1 \times 10^{-10}$ | $7.5 \times 10^{-10}$ | $7.0 \times 10^{-10}$ | $7.7 \times 10^{-10}$ | $10 \times 10^{-10}$ |

TABLE 2

| Stabilizer | Comparative examples | | | | | | | |
|---|---|---|---|---|---|---|---|---|
| | 1 | 2 | 3 | 4 | 5 | 6 | 7 | 8 |
| Ratio of Mw/Mn | 6.7 | 6.9 | 6.7 | 7.0 | 6.5 | 6.8 | 4.9 | 2.9 |
| MI | 45 | 45 | 44 | 47 | 45 | 46 | 45 | 295 |
| Stabilizer A | 0.050 | 0.215 | | 0.050 | 0.052 | | | |
| Stabilizer B | 0.025 | | | | 0.025 | | | |
| Stabilizer C | | | 0.150 | | | | | |
| Stabilizer D | 0.025 | | 0.220 | | 0.025 | | | |
| Stabilizer E | | 0.204 | | | | | | |
| Stabilizer F | | | | | 0.115 | | | |
| Amount of trap electric charge | $4.1 \times 10^{-10}$ | $2.2 \times 10^{-10}$ | $1.2 \times 10^{-10}$ | $3.1 \times 10^{-10}$ | $4.2 \times 10^{-10}$ | $5.0 \times 10^{-11}$ | $5.5 \times 10^{-11}$ | $5.9 \times 10^{-11}$ |

Industrial Applicability

As described above, the electret materials of the present invention are at very high level, and it is having high heat stability. It is therefore possible to offer a material with which to get high performance can be aimed in various practical applications.

and metal-containing hindered phenols against 100 parts by weight of polypropylene and by using, at least as a part, a polypropylene whose molecular weight distribution is 5.5 or less in the ratio of Mw/Mn (Mw:weight average molecular weight, Mn: number average molecular weight).

2. Electret materials according to claim 1, characterized in that said polypropylene further contains, as a stabilizer, at least one of stabilizers of phenol type, sulfur type and phosphoric type.

3. Electret materials according to claim 1 or 2, characterized in that the molecular weight distribution of polypropylene is 4.0 or less in Mw/Mn ratio.

4. Electret materials according to claim 1 or 2 characterized in that the polypropylene is a homopolymer.

5. Electret materials according to claim 1 or 2 characterized in that the polypropylene is a copolymerized polypropylene.

6. Electret materials according to claim 1 or 2, characterized in that the polypropylene is a blend of polypropylene with other thermoplastic resin.

7. Electret materials ,accord claim 1 or 2, characterized in that the electret material is comprised of a fibrous sheet and that the trap charge from a thermally excited depolarized electric current is $5 \times 10^{-10}$ coulomb/cm$^2$ or more.

8. Electret materials according to claim 1 or 2, characterized in that the electret materials is comprised of melt blow non-woven fabrics.

9. Electret materials according to claim 1 or 2, characterized in that the electret materials is comprised of spun-bonded fabrics.

10. Electret materials according to claim 1 or 2, characterized in that the electret materials is comprised of knitted and woven fabrics.

11. The method for preparing the electret materials characterized by using a polypropylene containing 0.01 parts by weight or more and 2 parts by weight or less of at least one stabilizer selected from stabilizers of hindered amines, nitrogen-containing hindered phenols and metal-containing hindered phenol, reducing the molecular weight distribution of the polypropylene to 5.5 or less in its ratio of Mw/Mn (Mw:weight average molecular weight, Mn:number average molecular weight), molding the compound in a desired shape and applying thereon an electret treatment.

* * * * *